INVENTOR.
JOHN S. DAVIS
BY Fraser and Bogucki
ATTORNEYS

Nov. 14, 1967 J. S. DAVIS 3,352,992

FABRICATING METHODS FOR ELECTRICAL CONNECTING STRUCTURES

Original Filed Jan. 2, 1964 3 Sheets-Sheet 2

INVENTOR.
JOHN S. DAVIS
BY
Fraser and Bogucki
ATTORNEYS

Nov. 14, 1967

J. S. DAVIS

FABRICATING METHODS FOR ELECTRICAL CONNECTING STRUCTURES 3,352,992

Original Filed Jan. 2, 1964

3 Sheets-Sheet 3

JOHN S. DAVIS
INVENTOR.

BY
Fraser and Bogucki
ATTORNEY 3,352,992

FABRICATING METHODS FOR ELECTRICAL CONNECTING STRUCTURES

John S. Davis, Glendale, Calif., assignor, by mesne assignments, to The Bunker-Ramo Corporation, Stamford, Conn., a corporation of Delaware Original application Jan. 2, 1964, Ser. No. 335,135. Divided and this application Oct. 4, 1966, Ser. No. 601,246
4 Claims. (Cl. 219—58)

ABSTRACT OF THE DISCLOSURE

Methods of making electrical connections to extremely fine, closely spaced electrical conductors extending along the surface of a conducting frame having a plurality of correspondingly spaced, electrically isolated, conducting terminals affixed thereto by running a spot welding wheel over the array of conductors spaced in contact with the corresponding terminals and energizing the spot welder at each point where a connection is to be made.

This invention relates to electrical connecting arrangements, and more particularly to such arrangements which are especially adapted for use with small, closely spaced electrical conductors. This application is a division of patent application Ser. No. 335,135, filed Jan. 2, 1964, now abandoned.

The current trend toward the miniaturization of electrical components and interconnecting conductors has amplified the problem of providing suitable connections to such equipment. As the conductors become smaller and are packed more closely together, it becomes more difficult to provide connectors which can reliably interconnect various groups of conductors between separate apparatus packages. Some arrangements provide rectangular elongated plugs which are adapted to receive printed circuit boards and, by the use of a plurality of spring clips or the like, make connections with etched conductors terminating along the edge of the circuit boards. Other arrangements are especially suited for making electrical connections to a plurality of conductors fabricated in the form of ribbon cable comprising an insulating material, such as a flexible plastic, having thin flat metallic strips embedded therein. Still other arrangements which accommodate conductors that are spaced more closely together resort to fan-out arrangements at the points at which interconnections are to be made in order that the spacing between interconnecting conductors may be increased and thus be adaptable to the minimum spacing between individual terminals or pins of presently known electrical connectors.

None of these previously known arrangements is satisfactory for providing the connections to the multitude of electrical conductors which are interwoven to form a woven wire screen memory. The woven wire screen memory is a comparatively recent development in the field of information storage devices and may comprise a plurality of substrate and control conductors which are interwoven and selectively coated with a remanently magnetic layer to provide a matrix of individual storage cells. An individual storage cell may particularly comprise a single mesh of the woven substrate conductors with control wires threading the screen mesh as desired. In order to use such a structure effectively as a memory device, electrical connections must be provided between the individual control wires of the woven memory matrix and associated equipment for storing information in the form of remanent magnetization conditions in the individual storage cells and for retrieving stored information therefrom. One particularly desirable feature of such a woven screen memory results from the fact that the structure is adaptable to fabrication by mass production automatic weaving techniques. For example, a substantial number of such screen memory matrices can be woven in a few minutes on an automatic loom and can be completed in a follow-on fabrication process in which each matrix is suitably treated and plated with remanent magnetic material.

However, the advantages of adaptability to such mass production fabrication techniques cannot be realized unless some means are provided for effecting the necessary electrical connections to be made between control equipment and the conductors threading the screen memory matrix. The magnitude of this problem may be appreciated when it is realized that the spacing between adjacent electrical conductors in such a matrix may be on the order of .005 to .015 inch, and the conductors themselves may be smaller than #30 wire A.W.G. Connections to such closely spaced, small conductors must be made rapidly, cheaply, and substantially automatically if the advantages of low cost storage cell fabrication, which are inherent in the woven screen memory devices, are to be fully realized. In addition, the reliability of the individual electrical connections must be extremely high, since a single matrix may require between 1,000 and 2,000 electrical connections to the various control conductors therein. For example, it is conceivable in a typical arrangement that an unreliability factor of 1% for connections to the individual control conductors may result in a loss to the woven screen matrix of 16% of the total number of storage cells therein.

Accordingly, therefore, it is a general object of the present invention to provide a suitable electrical connecting arrangement for a woven wire screen memory matrix.

More particularly, it is an object of the present invention to provide an electrical connector which is suitable for providing connections to a plurality of closely spaced electrical conductors.

It is an additional object of the present invention to provide an electrical connector for a wire screen memory matrix to which individual connections can be made rapidly, reliably, and automatically.

It is a still further object of the present invention to provide an electrical connecting arrangement for a wire screen memory matrix which may also serve the dual function of connecting the individual matrix control conductors to associated equipment and providing a rigid frame for the woven screen structure.

Still another object of the present invention is to provide a combination connector and frame for a woven screen memory matrix which is adaptable to the interconnection of a plurality of matrices in a stacked array.

Arrangements in accordance with the present invention will be described herein in the context of connectors and frames for a woven screen memory matrix. However, it will be clear that such electrical connecting arrangements, whether utilized as a frame for such a matrix or similar structure or whether simply utilized as an electrical connector, may be suitable for general application to the problem of providing electrical connections to closely spaced electrical conductors.

Particular arrangements in accordance with the present invention may comprise a bar of copper or similar material having a plurality of notches situated therein in accordance with the positions of the various conductors which are to be interconnected via the connector. A first group of these notches is intended for the positioning of terminals therein and may be filled with epoxy or other insulation in which the respective terminals are embedded. These terminal notches are arranged along the outer edge of the copper bar and serve to maintain the terminals electrically isolated from the copper bar. In each of the terminal notches, the respective terminals or conducting members attached thereto are brought out to the epoxy surface and maintained flush therewith. A second group of notches is provided for the looping or re-entry of two or more conductors in the associated woven matrix. These re-entry notches may also be filled with epoxy with a conducting plate or pad attached to the surface thereof and maintained in isolation from the copper bar. The remaining notches are arranged to provide clearance channels for the various conductors when a number of the matrices are placed adjacent one another in a stacked array. The inner edge of the copper bar contains a recessed step for the purpose of accommodating the screen edge trim in which the matrix conductors are interwoven.

The woven screen matrix connector frames in accordance with the invention are made up of a plurality of such bars of copper or other suitable metallic material rigidly affixed to each other to extend about a matrix along the edges thereof. The connector strips or bars are metallic and thus have greater strength and rigidity than plastic connectors with embedded pins, such as are pesently known. Furthermore, a particular advantage accrues from the use of the described arrangements in accordance with the present invention as connector-frames for woven screen matrices. In the fabrication process for woven screen magnetic memories, the screen is plated with a remanently magnetic material after being woven and provided with a connector-frame. In the plating step, it is highly desirable to have a metallic frame to help in obtaining a uniform potential field in the electroplating bath. Thus, the present invention not only provides an improved connector and frame for a woven screen matrix (which features may be utilized to advantage in other configurations of closely spaced electrical conductors), but it improves and helps stabilize the conditions which exist during the plating of a magentic layer in the fabrication of a woven screen memory element.

In accordance with a further particular aspect of the invention, a method of utilizing spot welding techniques is employed to provide automatically the desired connections between the matrix conductors and the terminal elements embedded in the connector bars. The woven screen structure and the connector frame are placed in proper juxtaposition on an index table of a spot welding machine. The terminal elements, i.e., the terminals and connecting pads, are suitably positioned along the copper bars comprising the connector-frame and are arranged for easy, rapid, and reliable connection to the respective conductors of the screen. After the woven screen control conductors are placed in position over the terminal elements to which they are to be connected, the spot welding machine index table is moved uniformly so that the roller head of the spot welder traverses the points at which connections are to be established between the respective conductors and their associated terminal elements. Each time the roller head traverses a conductor lying on top of an associated terminal element, the spot welder is activated to weld the conductor to its terminal element. If desired, the respective conductors may be stripped of insulation at the points which are to be welded prior to the positioning of the copper bar adjacent the conductors. However, in accordance with a further aspect of the invention, the roller head of the spot welding machine is applied with sufficient pressure against the copper bar and the conductors thereon so that as the roller passes over a conductor it ruptures the insulation on the conductor at the point of contact, thus facilitating the spot welding between the conductor and the associated terminal element at that point. Furthermore, this aspect of the invention contemplates the arrangement of the terminal elements in various levels, i.e., incremental distances from the surface of the copper bars, so that the roller head of the spot welding machine may traverse the conductors more than once and selectively establish connections during each traverse. For example, the terminals themselves may be embedded within the connector bar flush with the surface thereof, whereas the connector or re-entry pads may extend above the surface. By virtue of such an arrangement, the wires which are to be connected to the respective pads are spaced away from the surface of the copper bar by the thickness of the pad which is selected to correspond to the outside diameter of the conductors connecting to the terminals. Thus, when the roller head of the spot welding machine traverses these conductors in a second path along the length of the copper bar, the spacing between the roller head and the copper bar is increased by the thickness of the pad. This is arranged to accommodate the thickness of the conductors which are connected to the various terminals so that the welding machine roller head passes thereover without rupturing their insulation. However, when the roller head of the spot welding machine encounters a conductor positioned on top of a pad, the roller head applies sufficient pressure to rupture the insulation of such a conductor and activates the spot welding machine to weld the stripped conductor to the pad. It will be understood that the multitude of welded connections necessary for completing the necessary circuit paths between individual portions of the woven screen memory matrix and associated control equipment may be advantageously completed within a very short time through the use of the fabricating methods described.

A better understanding of the invention may be obtained from a consideration of the following detailed description, taken in conjunction with the accompanying drawings, wherein.

Figures 1, 2:
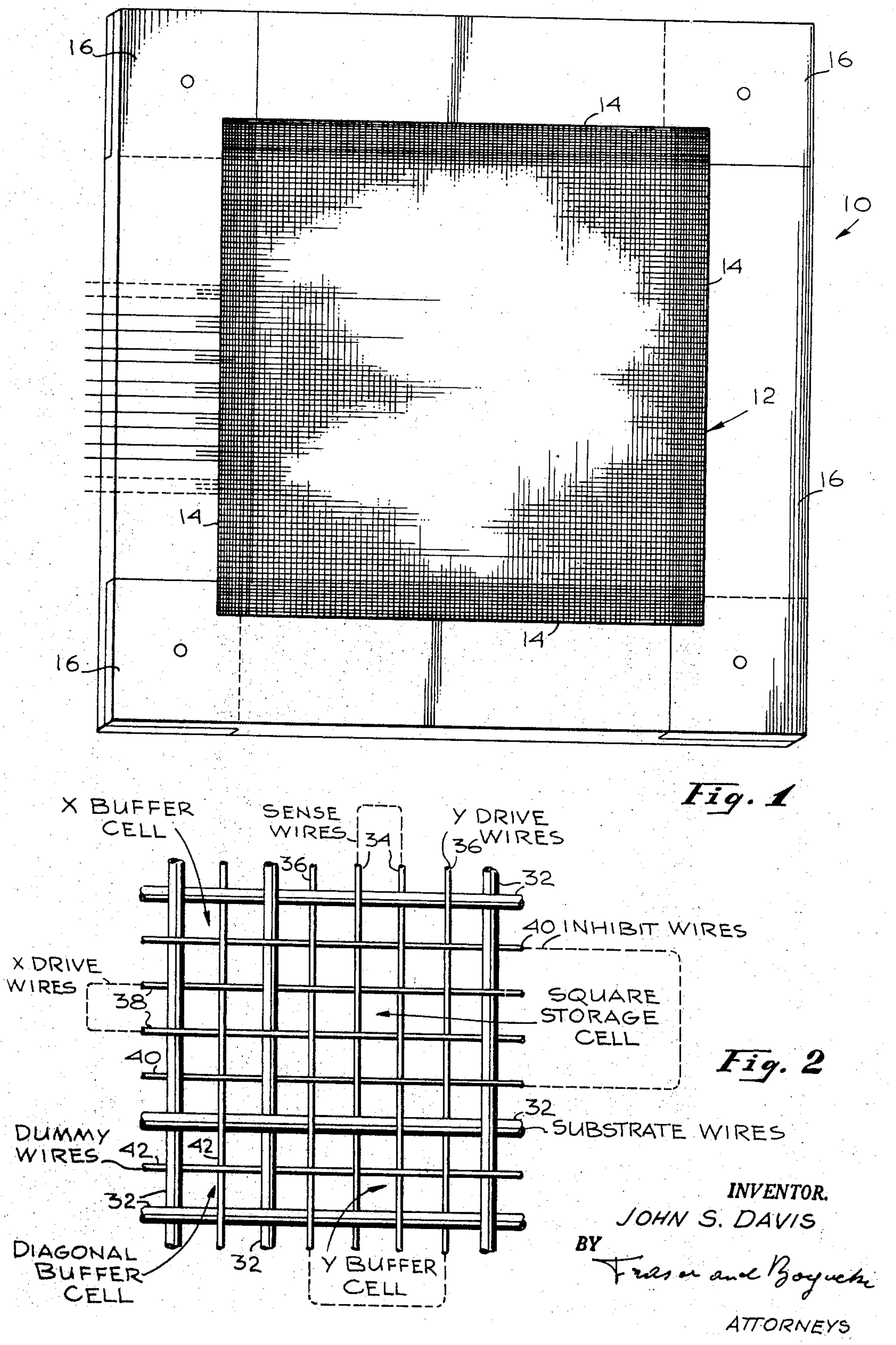
FIGURE 1 is a representation of one particular arrangement in accordance with the invention.
FIG. 2 is an illustrative diagram showing a typical woven screen memory storage cell in detail.

In FIG. 1, which represents one particular arrangement in accordance with the invention, an electrical connector 10 is shown arranged in the form of a frame on which a woven screen memory matrix 12 is mounted. Such a woven screen matrix generally comprises a plurality of insulated control conductors interwoven with a plurality of substrate wires. In the final fabrication process, the substrate wires are coated with a thin layer of remanently magnetic material to provide individual storage cells at the various intersections of the interwoven control wires. A typical cell configuration is shown in FIG. 2, which depicts the substrate wires 32 interwoven with a plurality of control wires to form a single storage cell with adjacent buffer cells. The control wires are variously designated in accordance with their circuit function and are shown as comprising the sense wires 34, the Y-drive wires 36, the X-drive wires 38, and the inhibit wires 40. As indicated by the dashed lines, the respective pairs of like wires are interconnected electrically via re-entry loops at opposite edges of the woven screen. Dummy wires 42 are also included to control the way in which the buffer cells are threaded by the associated control wires. A wide variety of other cell configurations may be woven to provide a storage matrix, but for the purpose of explaining the present invention, the representation of FIG. 2 will suffice.

Returning to FIG. 1, it should be noted that it is common to surround the memory matrix proper with an edge trim strip 14 of tightly woven wires which serve to prevent the matrix conductors from unravelling and also to establish a precise dimensional stability between these wires. There is no need for extending the substrate wires beyond the edge trim portions 14, and therefore the substrate wires are generally cut at the outer edge of this portion. However, the control conductors are brought out beyond the edge trim portions 14 along all four edges of the matrix 12. The control conductors are electrically and mechanically attached to the connector-frame 10 and may be cut to appropriate lengths thereafter.

As seen in FIG. 1, the frame and connector 10 comprises a plurality of individual copper bars 16, each of which is shaped to overlap at the corners, with connection at the corners being provided by flush riveting or spot welding. A number of the control wires are shown extending from the left-hand edge trim 14 for connection to the adjacent frame member 16.

Figures 3, 4, 5, 8:
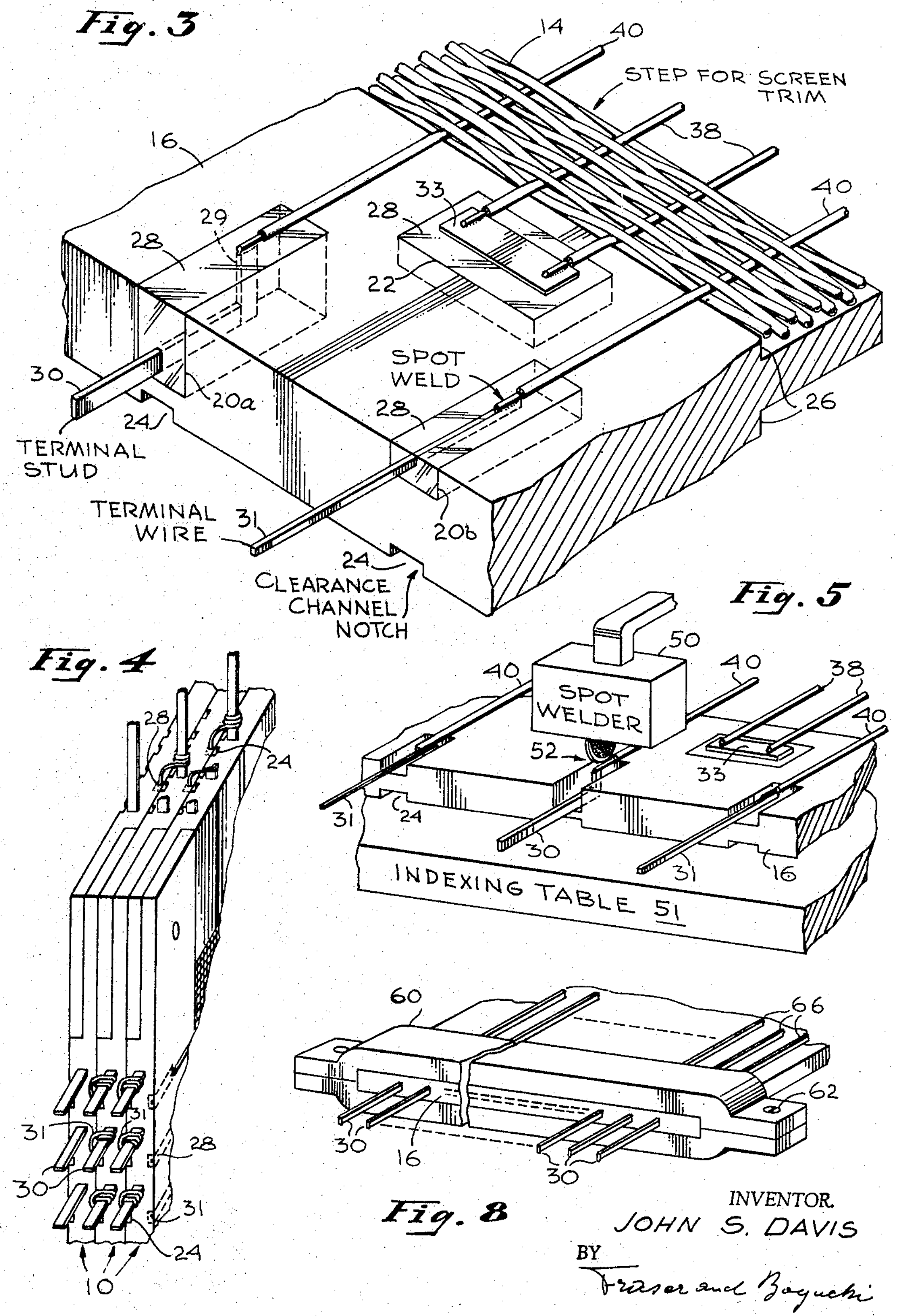
FIG. 3 is an enlarged perspective view of a portion of the arrangement shown in FIG. 1.
FIG. 4 is a view showing the interconnections between a plurality of electrical connectors constructed in accordance with the invention.
FIG. 5 is a perspective view representing the manner in which electrical connections are made between the wires and the connector structure of the invention.
FIG. 8 is a perspective view of another particular arrangement in accordance with the invention.

The manner in which these connections are provided may be better seen in FIG. 3, which is an enlarged perspective view of a portion of the structure of FIG. 1. In FIG. 3 the frame member 10 is shown as a copper bar 16 in which a number of notches have been cut. These may be referred to as the connector terminal notches **20*a* and 20*b*, the re-entry notches 22, and the clearance channel notches 24. The rear portion of the bar as shown in In FIG. 3 the frame member 10 is shown as a copper bar member 16 in FIG. 1, is also shown to have upper and lower stepped recess regions 26 for the purpose of accommodating the edge trim 14. In the depicted arrangement of the invention, the terminal notches 20*a*, 20*b* and the re-entry notches 22 are shown filled with an epoxy compound 28. The terminal notches 20*a* and 20*b* each have a terminal 30 or 31 embedded in the epoxy compound. In the notch 20*a*, the terminal 30 is shown as an L-shaped member having a portion 29 which extends to the upper surface of the epoxy compound 28. The terminal 31 is shown as a small nickel-plated copper wire extending along the upper surface of the epoxy compound 28 in the notch 20*b*. It will be understood that the terminals 30 and 31 are insulated from the copper bar 16 and held firmly in position by the epoxy compound 28**.

A copper pad 33 is shown affixed to the upper surface of the epoxy compound 28 in the re-entry notch 22. The pad 33 serves as the connecting bar for the X-drive wires 38 extending from the woven matrix and thus completes the loop circuit between the two wires 38 at the edge of the matrix. The wires 40 are shown spot welded to the respective terminals 30 and 31 to provide the desired external circuit connections to these wires.

Construction of the connector frame for a woven screen memory matrix in this manner provides a structure which is lightweight, rigid in holding a woven screen matrix, and effective in providing the desired connections between associated control circuitry and the matrix conductors. In the operation of such memory matrices, it is usually desirable to store a plurality of the structures in a stacked array to provide a three-dimensional memory structure. The clearance channel notches 24 and the stepped portions 26 of the copper bar shown in FIG. 3 readily facilitate such an arrangement, as may be seen in FIG. 4. Portions of three such matrix frames are shown in FIG. 4 stacked tightly together in a three-dimensional array. A considerable number of such matrices may be so stacked if desired. The notches 24 provide clearance for the wires 40 on the copper bar 16 of the adjacent frame 10, while the stepped portions 26 permit the edge trim 14 of the matrix to be recessed. Recesses (not shown) are also provided in the underside of the bar 16 to accommodate the pads 33 in the re-entry notches 22 of the adjacent bar. In a three-dimensional array, it is desirable to provide connections from one matrix to the next along like coordinates. For this purpose in this particular embodiment, the terminal 31 is shown as a wire, while the terminal 30 is depicted as a stud of rectangular cross section.

This arrangement permits the desired interconnection of adjacent memory matrices in a stacked array by wrapping the terminal wire 31 of one frame connector about the corresponding terminal stud 30 of the adjacent connector. This connection may be provided in accordance with well known solderless wire wrapping techniques or by any other suitable method. A completed circuit path may thus be provided through the stacked memory array in the third dimension at each individual level.

Figure 7:
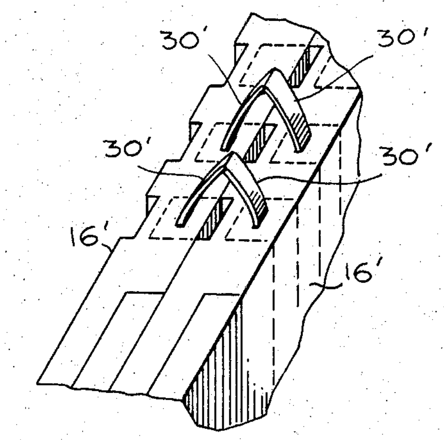
FIG. 7 is a view similar to FIG. 4 showing a somewhat different arrangement for providing interconnections between terminals of separate connectors.

Another particular arrangement for establishing circuit connections along third-dimensional coordinates between adjacent pairs of matrices in a stacked array is shown in FIG. 7. In this arrangement, the terminals 30′ are in the form of spring pins shaped to touch each other. Alternatively, the terminals 30′ may be dip-soldered to establish and maintain the desired electrical connections between adjacent matrices or they may be tin-plated so as to be fused together during the tin flow step in preparing the subsurface of the woven screen, prior to magnetic plating. The terminals 30′ may also be of a flat configuration suitable for crimping together with an appropriate tool, if desired.

One particularly effective way of completing the desired connections between the respective wires of a woven screen matrix and the terminals of the associated conductor is represented in FIG. 5, which shows a spot welding machine 50 being moved relative to a portion of a connector 16 to weld the various electrical connections. The spot welder 50 is shown including a roller 52 which is arranged to traverse the extent of the connector 16 as the connector 16, affixed to an indexing table 51, is moved therewith and to activate the spot welder mechanism 50 whenever a raised projection is encountered on the connector 16. The clearance of the roller head 52 is limited so that the pressure of the roller head 52 ruptures the insulation on the wires such as 40, thus laying bare the conductor for spot welding to the associated terminal, such as 30 or 31. As shown, the spot welder roller head 52 has made a welded connection between a wire 40 and an associated terminal wire 31, and is in the act of making a similar welded connection between another wire 40 and its associated terminal stud 30. After the terminals are connected in this fashion, the roller head 52 of the spot welder 50 is adjusted to clear the thickness of the wires 40, and the welder 50 is moved inwardly to traverse a path in line with the pad 33. Since the pad 33 protrudes above the surface of the conductor 16 by the thickness of the wire 40, the wires 38 which are to be connected to the pad 33 cause the roller head 52 to activate the spot welder 50 in the manner already described for the wires 40 during the first pass of the spot welder 50. Thus the insulation is stripped from the ends of the wires 38 and they are appropriately spot welded to the pad 33 to complete a re-entry circuit for the wires 38. This is accomplished without damaging the wires 40 in line with the pad 33 because of the clearance provided for the roller head 52.

Figure 6:
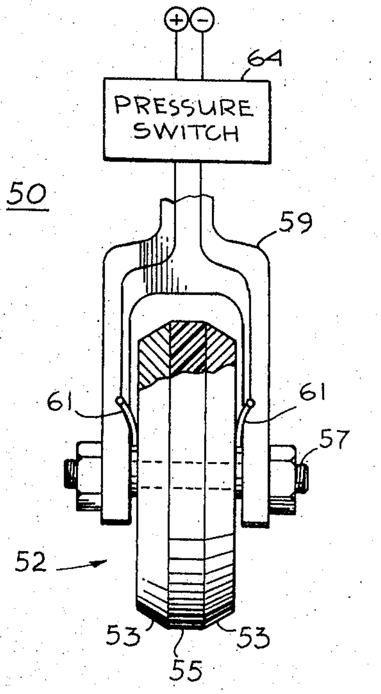
FIG. 6 is a view of a portion of the structure of FIG. 5 showing further details thereof.

The roller head 52 is shown in greater detail in FIG. 6 as comprising a pair of conductor wheels 53 separated by a thin insulating layer 55 in a sandwich structure. The roller head 52 is held in a yoke 59 by a shaft 57. Wiper elements 61 connect the respective wheels 53 of the roller head 52 to opposite terminals of a power source via a pressure switch 64. When the pressure switch 64 is closed, as the roller head 52 passes over a point to be spot welded, the circuit is completed to energize the wheels 53 which pass current therebetween through the conductor being spot welded (FIG. 5). This current extends to the terminal element beneath the conductor so that the two are firmly welded together.

FIG. 8 depicts another particular embodiment of the invention which may be employed for providing suitable electrical connections to a plurality of electrical conductors in a more general arrangement not restricted to a woven screen configuration. The arrangement of FIG. 8 is shown comprising a copper bar 16 in which a plurality of terminals 30 are positioned in accordance with the terminal portion of the structure generally shown in FIG. 3, for example. A plurality of wires 66 are connected to respective terminals 30 in the bar 16 in the manner already described. An encasing structure 60, which may be of Bakelite or other suitable insulating material, is provided to protect the electrical connections along the copper bar 16 and to facilitate the handling of the entire unit. As shown, the body member 60 comprises two half portions each being grooved to receive the copper bar 16 and held together by suitable fasteners 62 in a rugged connecting structure. Such a connecting structure may be provided for wires spaced much more closely than the 50-mil centers which are common in presently known connectors.

It will be appreciated that the electrical connecting structures and fabricating methods described above advantageously provide for the interconnection of associated circuitry with a plurality of small and very closely spaced wires. Each separate connection is established on an individual basis but in a manner which provides a reliable connection at extremely low cost. Accordingly, particular arrangements and methods of fabrication in accordance with the invention enable the development of connectors and connector-frames which are particularly well adapted to use with woven wire screen memory matrices.

Although there have been described above specific arrangements of electrical connecting structures in accordance with the invention for the purpose of illustrating the manner in which the invention may be used to advantage, it will be appreciated that the invention is not limited thereto. Accordingly, any and all modifications, variations, or equivalent arrangements falling within the scope of the annexed claims should be considered to be a part of the invention.

The embodiments of the invention in which an exclusive property or privilege is claimed are defined as follows:

1. The method of providing circuit connections between a plurality of terminal members affixed in respective notches of a metallic bar but electrically isolated therefrom and a corresponding plurality of conductors positioned along the surface of the bar in contact with the respective terminal members, the terminal members being aligned substantially parallel to the surface of the bar, comprising the steps of:

moving a spot welder along the bar in a path parallel to the surface and substantially transverse to said conductors, and energizing the spot welder as it traverses each conductor-terminal member pair in order to establish electrical and mechanical connection therebetween.

2. The method of providing circuit connections between a plurality of terminal members affixed in respective notches of a metallic bar but electrically isolated therefrom and a corresponding plurality of insulated conductors positioned along the surface of the bar in contact with the respective terminal members, the terminal members being aligned substantially parallel to the surface of the bar, comprising the steps of:

stripping the insulation from the conductors at the points where electrical connections are to be established between a conductor and a terminal member;

moving a spot welder along the bar to traverse the points at which the stripped conductors and the terminal members are in contact; and energizing the spot welder at each conductor-terminal member pair in order to establish electrical and mechanical connection therebetween.

3. The method of providing circuit connections between a plurality of terminal members affixed in respective notches of a metallic bar but electrically isolated therefrom and a corresponding plurality of insulated conductors positioned along the surface of the bar in contact with the respective terminal members, the terminal members being aligned substantially parallel to the surface of the bar, comprising the steps of:

moving a spot welder head along the bar to traverse the points at which electrical connections are to be established between conductor-terminal member pairs;

maintaining sufficient pressure against the spot welder head to rupture the insulation on a conductor as the head passes thereover; and energizing the spot welder head in response to pressure applied against the head as it passes over a conductor so as to establish a connection between the conductor and a corresponding terminal member.

4. The method of providing circuit connections between a plurality of terminal members affixed in respective notches of a metallic bar but electrically isolated therefrom and a corresponding plurality of insulated conductors positioned along the surface of the bar in contact with the respective terminal members, the terminal members being aligned substantially parallel to the surface of the bar, comprising the steps of:

arranging the terminal members and corresponding conductors at various incremental distances from the surface of the bar;

moving a spot welder head along the bar in a first path to traverse the points at which electrical connections are to be established between conductor-terminal member pairs positioned a first incremental distance from the surface of the bar;

maintaining sufficient pressure against the spot welder head to rupture the insulation on a conductor as the head passes thereover;

energizing the spot welder head in response to pressure applied against the head as it passes over a conductor so as to establish a connection between the conductor and the corresponding terminal member;

moving the spot welder head along the bar in a second path to traverse the points at which electrical connections are to be established between conductor-terminal member pairs positioned a second incremental distance from the surface of the bar;

maintaining sufficient pressure against the spot welder head to rupture the insulation on a conductor positioned at said second incremental distance without damaging the insulation on conductors at said first incremental distance; and energizing the spot welder head to establish a connection between the conductor at said second incremental distance and its corresponding terminal member.

References Cited

UNITED STATES PATENTS

| | | | |
|---|---|---|---|
| 1,694,081 | 12/1928 | Reed | 219—56 |
| 2,918,521 | 12/1959 | Abrams | 174—166.1 X |
| 3,252,203 | 5/1966 | Alberts et al. | 219—58 X |

RICHARD M. WOOD, *Primary Examiner.*

B. A. STEIN, *Assistant Examiner.*